(12) United States Patent
Cao et al.

(10) Patent No.: US 12,173,724 B2
(45) Date of Patent: Dec. 24, 2024

(54) METHOD FOR CONFIGURING A LEADING EDGE OF A COMPRESSOR STATOR PLATFORM AND THE CORRESPONDING STATOR PLATFORM

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Chuanjun Cao, Shanghai (CN); Jinchun Wang, Shanghai (CN); Zeyong Yin, Shanghai (CN); Jibao Li, Shanghai (CN); Fan Wu, Shanghai (CN); Xiaoshi Zhang, Shanghai (CN); Zhilong Zhai, Shanghai (CN); Yixuan Jiang, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 0 days.

(21) Appl. No.: 18/256,103

(22) PCT Filed: Nov. 3, 2021

(86) PCT No.: PCT/CN2021/128418
§ 371 (c)(1),
(2) Date: Jun. 6, 2023

(87) PCT Pub. No.: WO2022/121564
PCT Pub. Date: Jun. 16, 2022

(65) Prior Publication Data
US 2024/0026894 A1    Jan. 25, 2024

(30) Foreign Application Priority Data

Dec. 7, 2020    (CN) .......................... 202011413883.0

(51) Int. Cl.
*F04D 29/32*    (2006.01)
(52) U.S. Cl.
CPC ................................ *F04D 29/322* (2013.01)
(58) Field of Classification Search
CPC ...................................................... F04D 29/322
See application file for complete search history.

(56) References Cited

U.S. PATENT DOCUMENTS

| | | | |
|---|---|---|---|
| 2008/0131271 A1 | 6/2008 | Wood et al. |
| 2009/0317232 A1 | 12/2009 | Guemmer |
| 2013/0315738 A1 | 11/2013 | Snecma |

FOREIGN PATENT DOCUMENTS

| | | | |
|---|---|---|---|
| CN | 102906429 A | 1/2013 |
| CN | 105934562 A | 9/2016 |
| | (Continued) | |

OTHER PUBLICATIONS

International Search Report issued on Jan. 29, 2022, in corresponding International Patent Application No. PCT/CN2021/128418, 7 pages.

*Primary Examiner* — Brian O Peters
(74) *Attorney, Agent, or Firm* — Maier & Maier, PLLC

(57) ABSTRACT

A method includes simplifying flowing of airflow at root of a rotor blade into flowing of free jet, and determining an airflow expansion angle according to Mach number of incoming flow at root of a stator vane; calculating a radial height difference between a first end point on a leading edge of a stator platform and a trailing edge of an adjacent rotor platform by using an axial distance thereof, the angle and a deviation coefficient; determining position of the first end point with radial height difference; determining intersection (Continued)

point of the leading edge and the stator platform as position of a second end point on the leading edge; and determining a profile line between the points by bridging spline curves, so that the tail end thereof is tangent to the intersection line, and the starting end thereof is kept on same plane as side wall of the leading edge.

9 Claims, 7 Drawing Sheets

(56) References Cited

FOREIGN PATENT DOCUMENTS

| | | |
|---|---|---|
| CN | 106979177 A | 7/2017 |
| CN | 109209995 A | 1/2019 |
| CN | 112211853 A | 1/2021 |
| DE | 102004009696 B3 | 8/2005 |

METHOD FOR CONFIGURING A LEADING EDGE OF A COMPRESSOR STATOR PLATFORM AND THE CORRESPONDING STATOR PLATFORM

TECHNICAL FIELD

The disclosure relates to the field of compressor in aeroengine, in particular to the configuration of a stator and its platform of an axial compressor.

BACKGROUND

An axial compressor refers to a compressor in which the direction of air flow on the meridian plane is substantially parallel to the rotor axis, often used for high pressure compressor in aeroengine. The axial compressor is generally composed of a series of rotors and stators arranged alternately to provide the functions such as gas delivery and compression.

In the axial compressor, a certain axial spacing is provided between the rotor and the stator to prevent axial rub impact between the rotor and the stator, thereby forming a cavity structure at the root area of the rotor and the stator. At the meantime, a labyrinth seal is generally provided at the root of the stator to prevent the loss of leakage. However, in the actual situation, a small part of the airflow will still enter the cavity structure through the labyrinth seal, so that the leakage flow will have an impact on the main flow.

In addition, the unreasonable design in terms of structural form of the platform will lead to the gas at the blade root of the previous row impacting on the blade platform of the next row, thereby causing the flow loss, which can also be called the impact loss. At the meantime, the leakage flow at the blade root will further cause an increase in the flow loss at the blade root of the next row. The leakage flow and the flow loss affect the efficiency level of the compressor significantly.

Therefore, there is a need for a platform which can reduce the leakage flow at the blade root and the impact loss of the main flow at the blade platform of the next row.

SUMMARY

The disclosure provides a method for configuring a leading edge of a compressor stator platform and the corresponding stator platform.

In the first aspect, the disclosure provides the method for configuring the leading edge of the compressor stator platform based on the free jet theory, comprising: simplifying a flow of an airflow at a root of a blade of a rotor to a flow of a free jet, and then based on a Mach number of an incoming flow at a root of a vane of a stator, determining an airflow expansion angle generated when the airflow at the root of the blade of the rotor passes through an axial spacing between an adjacent trailing edge of a platform of the rotor and a leading edge of a platform of the stator and; calculating a difference in radial height between a first end point on the leading edge of the platform of the stator and the adjacent trailing edge of the platform of the rotor by the axial spacing between the leading edge of the plat form of the stator and the adjacent trailing edge of the platform of the rotor, the airflow expansion angle and a deviation factor, where the deviation factor is generated by the simplification of the flow of airflow to the flow of free jet when the airflow passes through the axial spacing; determining a position of the first end point on the leading edge of the platform of the stator based on the difference in radial height; determining an intersection of the leading edge of the vane of the stator and the platform of the stator as a position of a second end point on the leading edge of the platform of the stator; and determining a profile line between the first end point and the second end point by spline bridging, so that an end of the profile line is tangent to the intersection of the root of the vane of the stator and the platform of the stator, and a starting end of the profile line remains in the same plane as a side wall of the leading edge of the platform of the stator.

In the second aspect, the disclosure provides a compressor stator platform with a leading edge configured by the methods according to the first aspect.

In the third aspect, the disclosure provides a compressor stator, comprising: a first jet hole component and a second jet hole component provided on a bottom surface and a side surface of the stator platform respectively, the first and second jet hole components comprise a plurality of jet holes spaced circumferentially; a labyrinth seal provided on a bottom of the stator corresponding to the platform; wherein the second jet hole component is configured for introducing airflow, the first jet hole component is configured for exporting airflow, and the first jet hole component and the second jet hole component are coupled by chamfering to form an airflow path.

Compared with the prior art, the stator platform determined by the method for configuring the leading edge of the stator platform of the disclosure can prevent impact loss of the main flow effectively by determining the profile line of the leading edge of the platform. At the meantime, the stator platform is provided with the jet hole components, which cooperates with the labyrinth seal on a bottom of the stator, so as to introducing the high pressure gas at the trailing edge of the stator vane to the blade tip of the labyrinth seal, forming an aerodynamic wall, thereby reducing the leakage flow into the cavity structure effectively.

BRIEF DESCRIPTION OF THE DRAWINGS

The features, objectives and benefits of the disclosure will become more obvious by referring to the detailed description of non-limiting embodiments with reference to the following drawings.

DETAILED DESCRIPTION

In order to make the objectives, technical solutions and benefits of the present disclosure to be understood more clearly, the disclosure will be further described in detail below with reference to specific embodiments and accompanying drawings. In the following detailed description, various specific details are described to provide a thorough understanding of the described exemplary embodiments. However, it is obvious to those skilled in the art that the described embodiments can be implemented without some or all of these specific details. In other example embodiments, structures which are common general knowledge are not described in detail to avoid unnecessarily obscuring the concepts of the present disclosure. It should be understood that the specific embodiments described herein are only used to explain the disclosure, but not to limit the disclosure. Meanwhile, various aspects described in the embodiments can be combined in any way without conflict.

It should be noted that in this disclosure, an axial compressor refers to a compressor in which the direction of air flow on the meridian plane is substantially parallel to the rotor axis. A platform refers to a part extending along the flow channel at the root of the blade to achieve the shape of the flow channel for the rotor blade of the axial compressor and the cantilevered stator vane. A free jet refers to a jet that is not constrained by side walls. In the context of the free jet, gas is ejected from a nozzle into an infinite space filled with a stationary medium that has the same physical properties as the injected gas.

It should be understood that any term or word used in this disclosure has its general meaning in the art, particularly in the field of aeroengine compressor, unless otherwise indicated.

For a better understanding of the present disclosure, various aspects of the disclosure are described below with reference to accompanying drawings and specific embodiments.

Figure 1A:
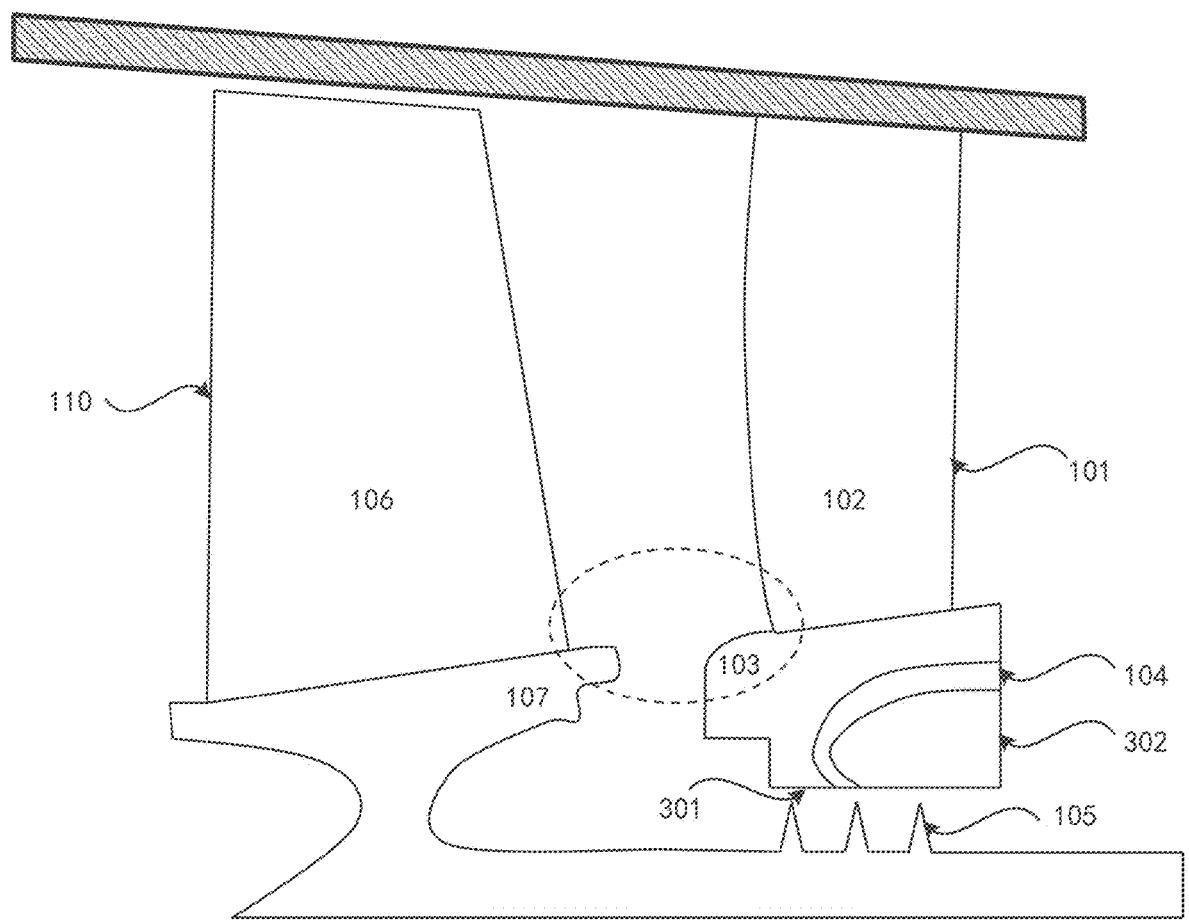
FIG. 1A is a diagram of the compressor stator comprising the stator vane, the stator platform, the jet hole component and the labyrinth seal according to each aspect of the disclosure.

Referring to FIG. 1A, FIG. 1A is a diagram of a compressor stator 101 comprising a stator vane 102, a stator platform 103, a jet hole component 104 and a labyrinth seal 105 according to each aspect of the disclosure. In some embodiments, each aspect of the disclosure is described in the context of the axial compressor. In some embodiments, a rotor-stator configuration is shown in FIG. 1A, wherein a rotor 110 is on the left hand side and the stator 101 is on the right hand side. The rotor may comprise a blade 106 and a platform 107, similarly, the stator 101 may comprise the blade 102, the platform 103 and a bottom which is connected to a bottom of the rotor platform and provided with the labyrinth seal 105. A leading edge configuration of the stator platform, the jet hole component and the labyrinth seal on the stator platform will be described respectively in the detailed description below.

Figure 1B:
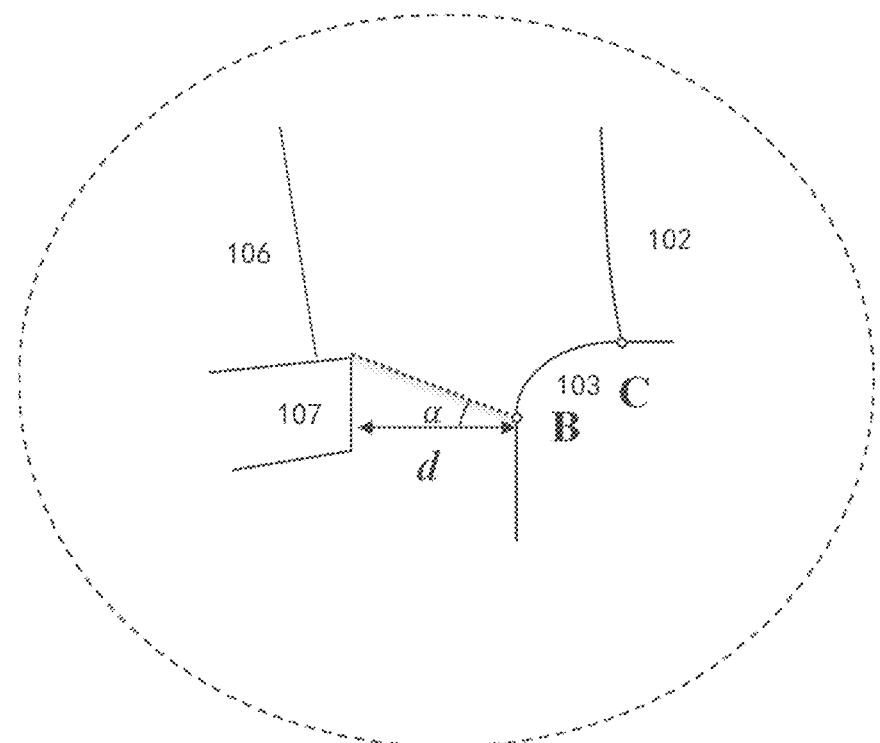
FIG. 1B is an enlarged schematic diagram of the leading edge configuration of the stator platform.
Figure 2:
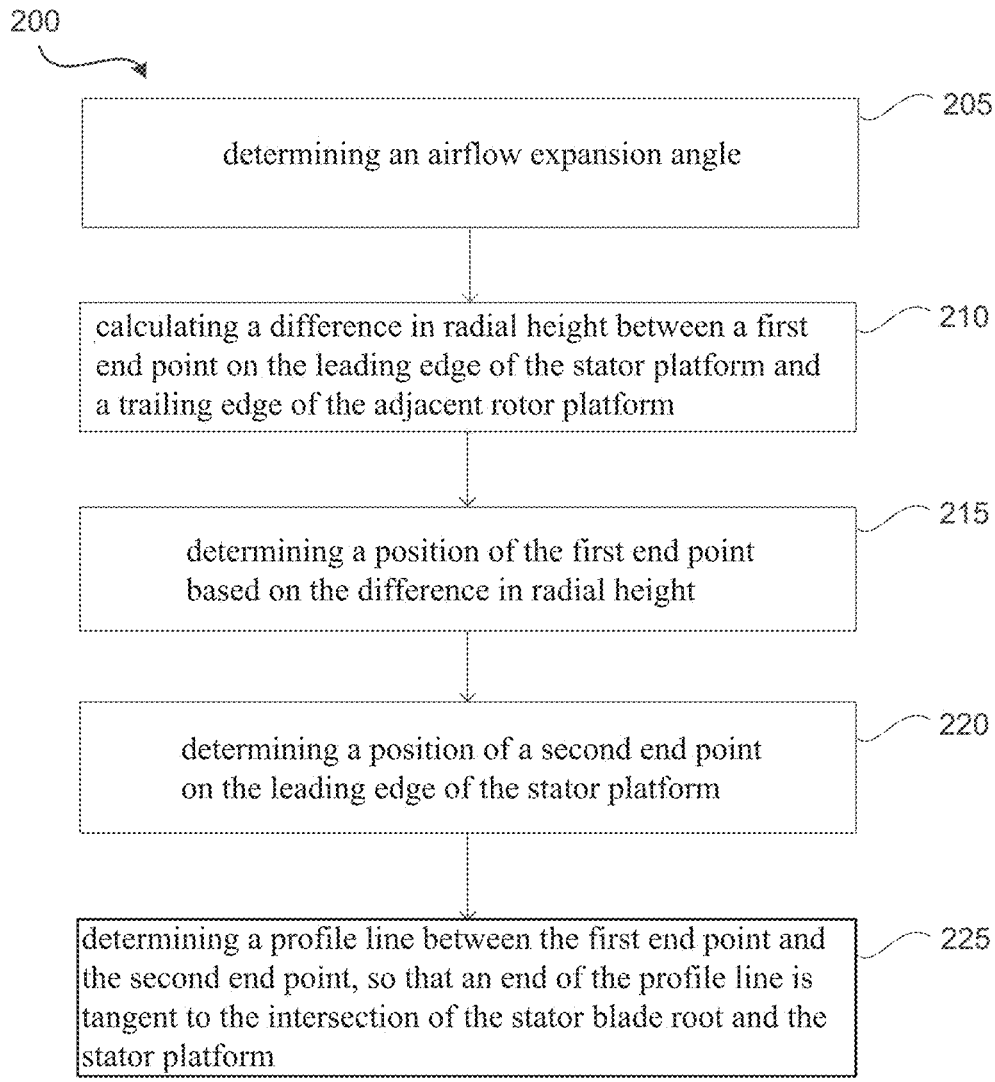
FIG. 2 is a flow diagram of the method for configuring the leading edge of the compressor stator platform based on the free jet theory according to each aspect of the disclosure.

As shown in FIG. 1B, an enlarged schematic diagram of the leading edge configuration of the stator platform in FIG. 1A is shown in the dashed circle in FIG. 1B. FIG. 2 shows a flow diagram of a method for configuring the leading edge of the compressor stator platform based on the free jet theory according to each aspect of the disclosure. Firstly, the leading edge configuration of the stator platform according to each aspect of the disclosure will be described with reference to FIG. 1A, FIG. 1B and FIG. 2.

In step 205, an airflow expansion angle is determined based on the Mach number of the incoming flow at the root of the stator vane by simplifying the flow of airflow at the root of the rotor blade to the flow of free jet. In an embodiment, the airflow expansion angle α can be determined based on the Mach number of the incoming flow at the root of the stator vane (i.e., near the hub). In an embodiment, the airflow expansion angle α can be determined based on the following fitting formula (1):

$$\alpha = -280.2M^5 + 615.04M^4 - 471.35M^3 + 137.19M^2 - 0.0831M + 4.9801 \quad (1)$$

where M is the Mach number of the incoming flow at the root of the stator vane, ranging from 0.1-0.8. In a preferred embodiment, the Mach number M is 3, and the airflow expansion angle α can be determined to be 9 degrees.

In step 210, a difference in radial height between a first end point on the leading edge of the stator platform and a trailing edge of the adjacent rotor platform is calculated by an axial spacing between the leading edge of the stator platform and the trailing edge of the adjacent rotor platform, the airflow expansion angle and a deviation factor. It can be seen from FIG. 2 that a certain axial spacing is provided between the trailing edge of the rotor platform and the leading edge of the stator platform in the next row to prevent axial rub impact between the rotor and the stator. In an embodiment, the axial spacing is measured to be d millimeters (mm). When the airflow at the root of the rotor blade passes through the axial spacing, the flow tube would expand. In an embodiment, when the airflow passes through the axial spacing, the flow of airflow will be simplified to the flow of free jet, resulting in the deviation factor δ. The deviation is mainly caused by the fact that in the actual cavity flow, a small amount of high pressure gas from the subsequent stage will enter the cavity through the labyrinth seal, so there is a small difference between the flow and the result of free jet. In an embodiment, the value of δ ranges from 0.8-1.2.

In an embodiment, step 210 is based on equation (2):

$$\Delta y = d * \tan \alpha * \delta \quad (2)$$

where Δy is the difference in radial height between the first end point on the leading edge of the stator platform and the trailing edge of the adjacent rotor platform, α is the airflow expansion angle which is determined based on the Mach number of the incoming flow at the root of the stator vane, and δ is the deviation factor.

In step 215, a position of the first end point on the leading edge of the stator platform is determined based on the difference in radial height calculated. In an embodiment, the position of the first end point determined in step 215 is the position of point B shown in FIG. 1B.

In step 220, the intersection of the leading edge of the stator vane and the stator platform is determined as a position of a second end point on the leading edge of the stator platform. In an embodiment, the position of the second end point determined in step 220 is the position of point C shown in FIG. 1B. In an embodiment, the position of the second end point can be determined to be the intersection of the leading edge of the stator vane and the stator platform as a center plus a numerical tolerance. In an embodiment, the numerical tolerance can be ±0.3 times a vertical displacement between the leading edge of the stator vane root and a side wall of the stator vane platform.

In step 225, a profile line between the first end point and the second end point is determined by spline bridging, so that an end of the profile line is tangent to the intersection of the stator vane root and the stator platform, and a starting end of the profile line remains in the same plane as the side wall of the leading edge of the stator platform. In an embodiment, the starting end of the profile line is the first end point B shown in FIG. 1B, and the end of the profile line is the second end point C shown in FIG. 1B. In an embodiment, the profile line is configured such that the second end point C is the tangent point of the profile line to the intersection of the stator vane root and the stator platform (i.e., an upper edge line of the stator platform). In an embodiment, the profile line is configured such that the first end point B remains in the same plane as the side wall of the leading edge of the stator platform, so that the first end point B is transitioned smoothly to the lower half of the platform. In an embodiment, the side wall of the leading edge of the stator platform can be adjusted so that the first end point B is transitioned smoothly to the lower half of the platform.

The leading edge of the stator platform determined based on the method 200 shown in FIG. 2 can allow the airflow to enter the next row of stator vanes relatively smoothly, thereby avoiding the impact loss effectively.

Figure 3:
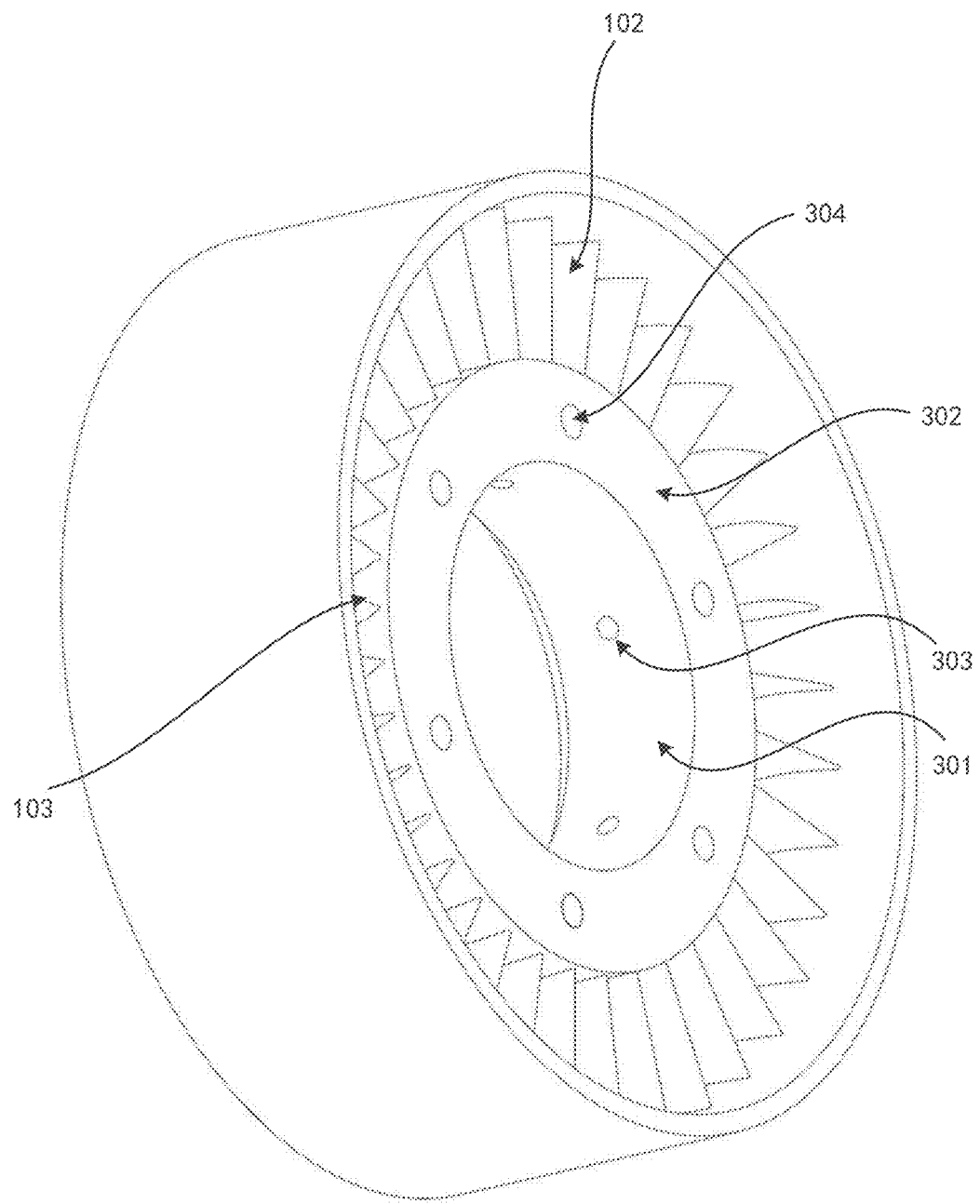
FIG. 3 is a 3D stereogram of the jet hole component for the stator platform according to each aspect of the disclosure.
Figure 4:
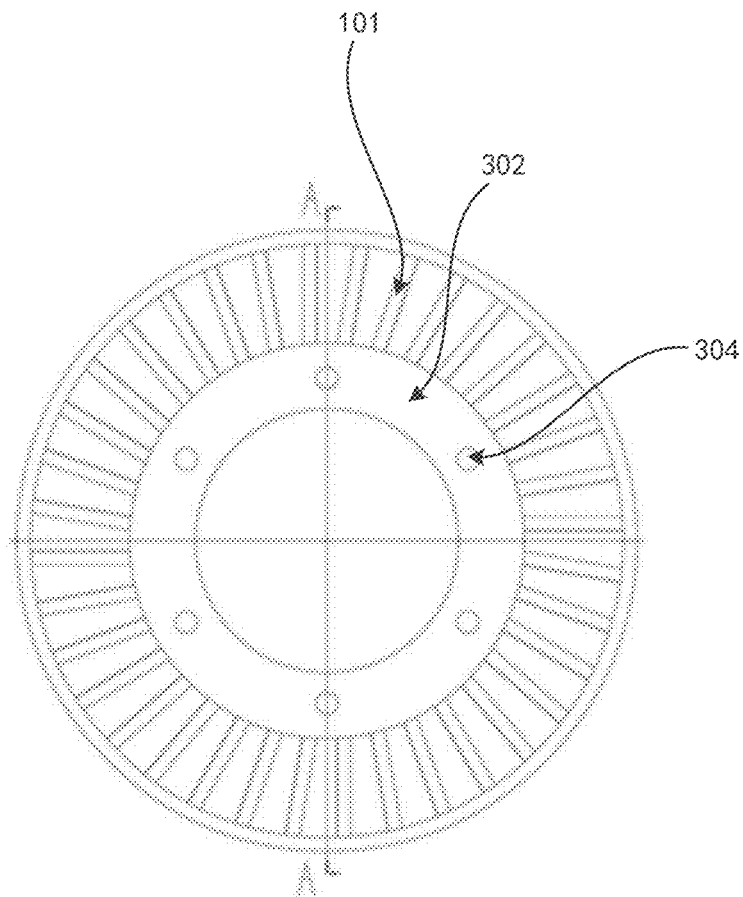
FIG. 4 is a front plan view of the jet hole component for the stator platform according to each aspect of the disclosure.
Figure 5:
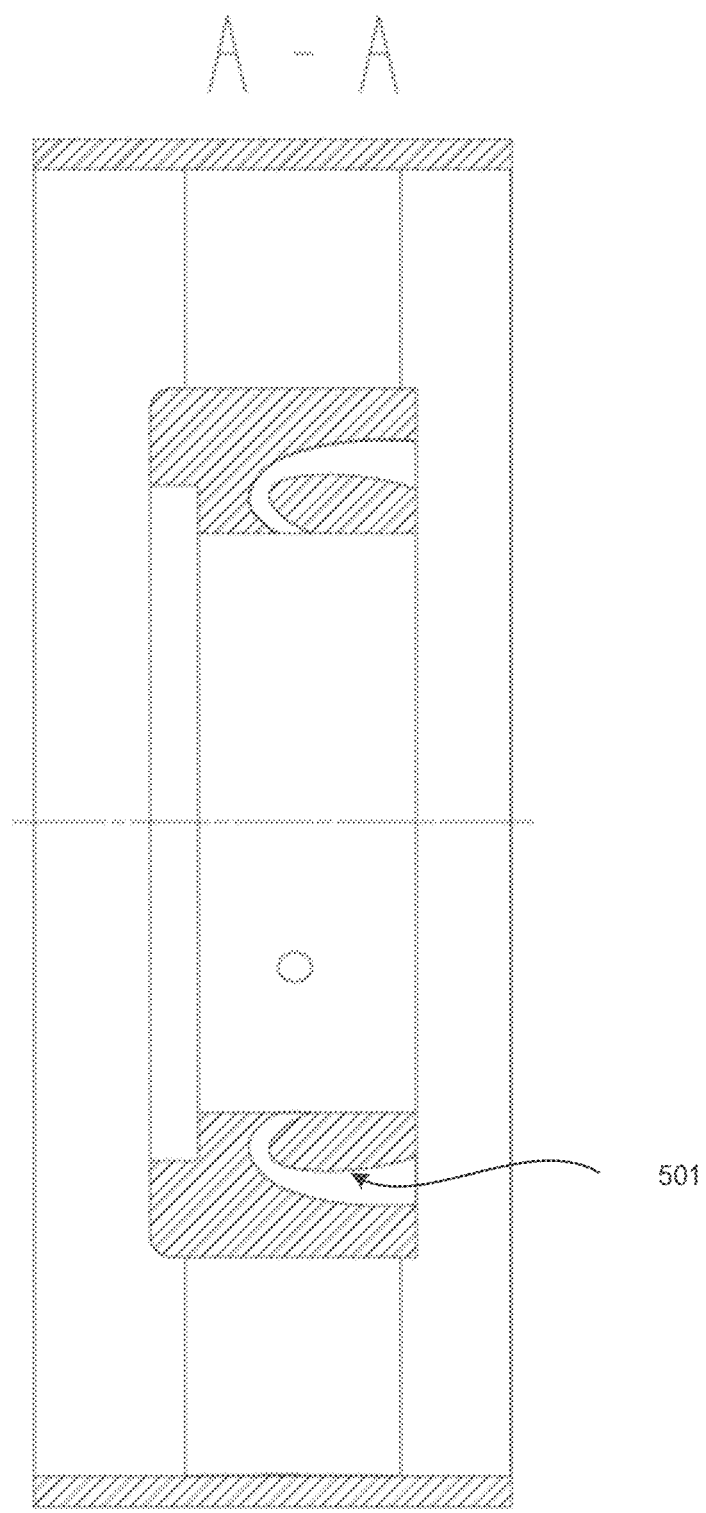
FIG. 5 is a cross sectional view taken at section A-A in FIG. 4 of the jet hole component for the stator platform according to each aspect of the disclosure.

The stator platform comprising the jet hole component according to each aspect of the disclosure will be described subsequently with reference to FIG. 1A, FIG. 1B and FIG. 3 to FIG. 5. FIG. 3 shows a 3D (three-dimensional) stereogram of the jet hole component for the stator platform according to each aspect of the disclosure. FIG. 4 shows a front plan view of the jet hole component for the stator platform according to each aspect of the disclosure. FIG. 5 shows a cross sectional view taken at section A-A in FIG. 4 of the jet hole component for the stator platform according to each aspect of the disclosure.

As shown in FIG. 1A and FIG. 1B, the stator platform according to each aspect of the disclosure comprises a first jet hole component 301 and a second jet hole component 302 provided on a bottom surface and a side surface of the stator platform respectively, the first and second jet hole components comprise a plurality of jet holes 303, 304 spaced circumferentially, as shown in FIG. 3 and FIG. 4. The stator platform further comprises the labyrinth seal provided on the bottom of the stator corresponding to the stator platform. In an embodiment, the labyrinth seal comprises a plurality of blade tip. In an embodiment, the second jet hole component 302 is configured for introducing airflow, and the first jet hole component 301 is configured for exporting airflow, the first jet hole component 301 and the second jet hole component 302 are coupled by chamfering to form an airflow path.

In an embodiment, a cross section of the first jet hole component 301 can be the same as or different from a cross section of the second jet hole component 302. In a preferred embodiment, the cross section of the first jet hole component 301 is smaller than the cross section of the second jet hole component 302, so that the airflow path formed by the first jet hole component 301 and the second jet hole component 302 is a converging flow path, as indicated by 501 in the A-A section view shown in FIG. 5. In the preferred embodiment, the converging flow path can improve the jet velocity effectively.

In an embodiment, the direction of the jet hole 303 of the first jet hole component 301 can range from a direction perpendicular to the labyrinth seal to a direction opposite to the direction of the incoming airflow (i.e., the direction of reverse airflow). In an embodiment, the airflow path formed by the first jet hole component 301 and the second jet hole component 302 can prevent the high pressure gas from entering the cavity through the labyrinth seal effectively, because the high pressure gas at the trailing edge of the stator vane can be introduced to the blade tip of the middle labyrinth seal due to the airflow path formed by jet hole components, thereby forming an aerodynamic wall thereon. The aerodynamic wall can further prevent the high pressure gas at the trailing edge of the stator vane from entering the cavity through the labyrinth seal effectively, so as to achieve the effect of reducing the leakage of airflow. In a preferred embodiment, the direction of the jet hole 303 of the first jet hole component 301 is the direction of the reverse airflow. In the preferred embodiment, the efficiency of introducing the high pressure gas at the trailing edge of the stator vane to the blade tip of the middle labyrinth seal 105 thereby forming the aerodynamic wall thereon will be further improved, and the effect of reducing the leakage at the blade root will be more significant, as shown by the cross section view of section A-A in FIG. 5.

In an embodiment, the second jet hole component 302 is configured to be parallel to the bottom surface of the platform. In an embodiment, the bottom of the leading edge of the stator platform is configured to be in a stepped shape for accommodating the trapped vortex of airflow. The stepped bottom of the leading edge of the stator platform can accommodate the trapped vortex of airflow formed under the steps, thereby further reducing the amount of leakage and reducing the impact of the leakage airflow on the main airflow. In an embodiment, the shape of the jet holes 303, 304 comprises circular, square, rectangular, or any combination thereof. In an embodiment, the stator platform comprising the jet hole component and the labyrinth seal 105 further comprises the leading edge configured based on the method shown in FIG. 2, as shown in FIG. 1A and FIG. 1B. In an embodiment, the stator platform comprises any combination of one or more of the following: the leading edge with the profile line determined based on the configuration method shown in FIG. 2, the airflow path and the labyrinth seal formed by the first jet hole component 301 and the second jet hole component 302 provided on the bottom surface and the side surface of the stator platform respectively, and the stepped bottom of the platform leading edge. In a preferred embodiment, the stator platform comprises each one of the leading edge with the profile line determined based on the configuration method shown in FIG. 2, the airflow path and the labyrinth seal formed by the first jet hole component 301 and the second jet hole component 302 provided on the bottom surface and the side surface of the stator platform respectively, and the stepped bottom of the platform leading edge.

Although aspects of the disclosure are described above in the context of the stator platform, those skilled in the art should understand that the above method for configuring the leading edge of the stator platform can be applied for configuring the leading edge of the rotor platform without depart from the spirit and scope of this disclosure.

Figure 6:
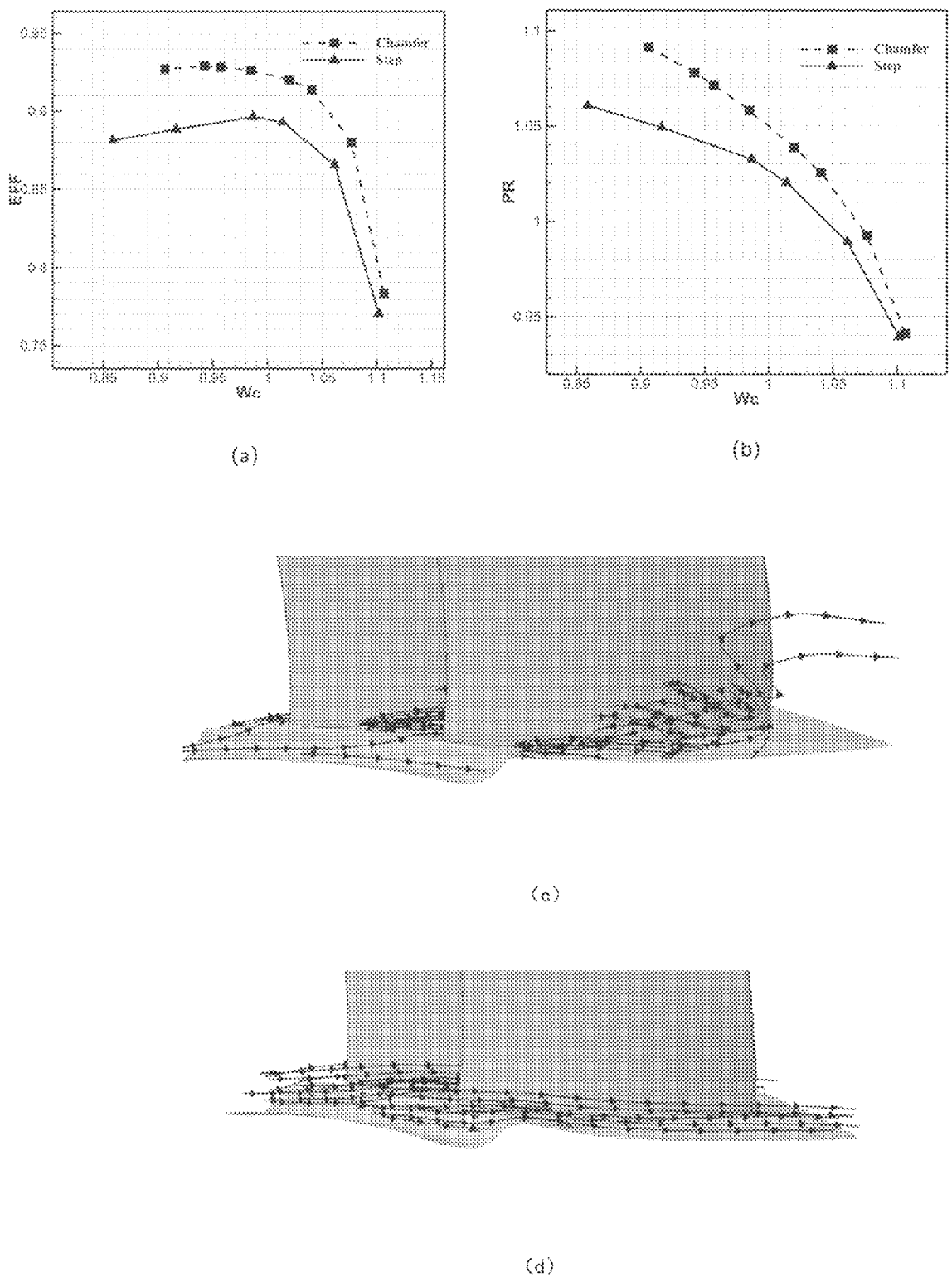
FIG. 6 is a comparison diagram of the performance of the compressor stator platform provided according to each aspect of the disclosure and the conventional platform.

The performance of the stator platform according to each aspect of the disclosure will be compared with the conventional platform subsequently with reference to FIG. 6. FIG. 6 is a comparison diagram of the performance of the compressor stator platform provided according to each aspect of the disclosure and the conventional platform.

In an embodiment, a single-channel 3D numerical simulation is carried out for three-row compressor blades, and the geometry of the cavity is not simulated in the numerical simulation, after determining the position of point B (the value of δ is 1.1) using the above equation (2), the trailing edge point of the blade platform at the front row and the point B are connected as a solid wall boundary condition for simulation. As shown in FIG. 6, the Step solution is corresponding to the conventional platform, which is the stepped configuration of the platform leading edge, and the Chamfer solution is corresponding to the platform configuration provided according to each aspect of the disclosure. FIG. 6(a) shows a comparison diagram of the efficiency of the platform with and without the configuration based on the method of the disclosure, wherein the horizontal axis is the flow rate and the vertical axis is the efficiency. FIG. 6(b) shows a comparison diagram of the pressure ratio of the platform with and without the configuration based on the method of the disclosure, wherein the horizontal axis is the flow rate and the vertical axis is the normalized pressure ratio. As can be seen from FIG. 6, the results of numerical simulation show that with the conventional platform, a large radial positive angle of incidence will be formed when the airflow passes through the blade root at the next row, thereby leading to a worse flow condition around the angle area of the blade root, as shown in FIG. 6(c), and the pressure ratio and efficiency will decrease, as shown in FIG. 6(a) and FIG. 6(b). As can be seen from FIG. 6, when the dimensionless flow rate is smaller than 1, with the configuration provided according to each aspect of the disclosure, the efficiency is substantially improved by 2% and above. The effect of using the configuration provided according to each aspect of the disclosure can be more significant under the working condition of low flow, which allows the airflow to enter the blade path at the next row smoothly, reducing the flow loss, as shown in FIG. 6(d), and the efficiency can be improved by at most 2.5%.

It should be noted that the above methods describe the possible implementations, various operations and steps can be rearranged or modified in other ways, and other implementations are also possible. Furthermore, aspects from two or more methods can be combined.

As used herein (including in the claims), the term 'or' used for enumerating (for example, enumerating with a phrase such as 'at least one of' or 'one or more of') refers to an inclusive enumerating, such that for example, enumerating at least one of A, B or C means A or B or C or AB or AC or BC or ABC (i.e., A and B and C). Likewise, as used herein, the term 'based on' should not be understood as a closed set of conditions. For example, an exemplary step described as being based on condition 'A' can be based on both condition A and condition B without departing from the scope of the disclosure. In other words, as used herein, the term 'based on' should be understood in the same manner as the term 'at least partially based on'.

Similar components or features can have the same reference signs in the drawings. In addition, various components of the same type can be identified by adding a dash to the reference sign and a second sign for identifying the similar components. If only a first reference sign is used in the specification, any one of the similar components with the same first reference sign can be applied to the description, regardless of the second reference sign, or other subsequent reference signs.

The description described herein with reference to the drawings describes exemplary configurations and does not represent all the embodiments that can be implemented or fall within the scope of the disclosure. As used herein, the term 'exemplary' means 'as an example, embodiment or illustration', but not 'preferable' or 'better than other examples'. The detailed description comprises specific details for providing an understanding of the described techniques. However, the techniques can be implemented without the specific details. In some embodiments, the structures and devices of common general knowledge are shown in the form of block diagram to prevent obscuring the concepts of the described embodiments.

The description provided herein is to allow any person skilled in the art to produce or use the disclosure. Various modifications to the disclosure are obvious to those skilled in the art, and the general principles defined herein can be applied to other modifications without departing from the scope of the disclosure. Thus, the disclosure is not to be limited to the embodiments and designs described herein, but should be accorded the widest scope consistent with the principles and novel features disclosed herein.

The invention claimed is:

1. A method for configuring a leading edge of a compressor stator platform based on the free jet theory comprising:
   simplifying a flow of an airflow at a root of a blade of a rotor to a flow of a free jet, and then based on a Mach number of an incoming flow at a root of a vane of a stator, determining an airflow expansion angle generated when the airflow at the root of the blade of the rotor passes through an axial spacing between an adjacent trailing edge of a platform of the rotor and a leading edge of a platform of the stator and;
   calculating a difference in radial height between a first end point on the leading edge of the platform of the stator and the adjacent trailing edge of the platform of the rotor by the axial spacing, the airflow expansion angle, and a deviation factor, where the deviation factor is generated by the simplification of the flow of airflow to the flow of free jet when the airflow passes through the axial spacing;
   determining a position of the first end point on the leading edge of the platform of the stator based on the difference in radial height;
   determining an intersection of the leading edge of the vane of the stator and the platform of the stator as a position of a second end point on the leading edge of the platform of the stator;
   determining a profile line between the first end point and the second end point by spline bridging, so that an end of the profile line is tangent to the intersection of the root of the vane of the stator and the platform of the stator, and a starting end of the profile line remains in the same plane as a side wall of the leading edge of the platform of the stator,
   wherein the airflow expansion angle α based on the Mach number of the incoming flow at the root of the vane of the stator is determined by the following equation:

$$\alpha = -280.2M^5 + 615.04M^4 - 471.35M^3 + 137.19M^2 - 0.0831M + 4.9801$$

where M is the Mach number of the incoming flow at the root of the vane of the stator, ranging from 0.1-0.8; and
   manufacturing the compressor stator platform to have the profile line.

2. The method according to claim 1, wherein the difference in radial height is calculated by the following equation:

$$\Delta y = d * \tan \alpha * \delta \qquad (2)$$

where d is the axial spacing measured between the leading edge of the platform of the stator and the adjacent trailing edge of the platform of the rotor, α is the airflow expansion angle, and δ is the deviation factor, ranging from 0.8-1.2.

3. A compressor stator platform with a leading edge configured by the method according to claim 1.

4. A compressor stator with a compressor stator platform according to claim 3, comprising: a first jet hole component and a second jet hole component provided on a bottom surface and a side surface of the platform of the stator respectively, the first and second jet hole components comprise a plurality of jet holes spaced circumferentially;
   a labyrinth seal provided on a bottom of the stator corresponding to the platform;

wherein the second jet hole component is configured for introducing airflow, the first jet hole component is configured for exporting airflow, and the first jet hole component and the second jet hole component are coupled by chamfering to form an airflow path.

5. The compressor stator according to claim 4, wherein a cross section of the first jet hole component is smaller than a cross section of the second jet hole component, so that the airflow path formed is a converging flow path.

6. The compressor stator according to claim 4, wherein a direction of the jet hole of the first jet hole component ranges from a direction perpendicular to the labyrinth seal to a direction opposite to a direction of the incoming flow.

7. The compressor stator according to claim 4, wherein the second jet hole component is configured to be parallel to the bottom surface of the platform.

8. The compressor stator according to claim 4, wherein the bottom of the leading edge of the stator platform is configured to be in a stepped shape for accommodating trapped vortex of airflow.

9. The compressor stator according to claim 4, wherein the shape of the jet hole comprises circular, square, rectangular, or any combination thereof.

\* \* \* \* \*